United States Patent
Lezcano et al.

(10) Patent No.: US 12,147,420 B2
(45) Date of Patent: Nov. 19, 2024

(54) SYSTEMS AND METHODS FOR DETECTING AND RESOLVING AMBIGUOUS SEARCH QUERIES

(71) Applicant: Walmart Apollo, LLC, Bentonville, AR (US)

(72) Inventors: Leonardo Lezcano, Rocklin, CA (US); Vachik Shailesh, Sunnyvale, CA (US); Krishna Sravanthi, Dublin, CA (US); Ciya Liao, Fremont, CA (US); Pankaj Adsul, Wood Ridge, NJ (US); Rajyashree Mukherjee, San Carlos, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 111 days.

(21) Appl. No.: 17/588,599

(22) Filed: Jan. 31, 2022

(65) Prior Publication Data
US 2023/0281194 A1    Sep. 7, 2023

(51) Int. Cl.
*G06F 16/242* (2019.01)
*G06F 16/2453* (2019.01)
*G06F 40/30* (2020.01)

(52) U.S. Cl.
CPC .... *G06F 16/2425* (2019.01); *G06F 16/24539* (2019.01); *G06F 40/30* (2020.01)

(58) Field of Classification Search
CPC . G06F 16/2425; G06F 16/24539; G06F 40/30
See application file for complete search history.

(56) References Cited

U.S. PATENT DOCUMENTS

| | | | |
|---|---|---|---|
| 7,917,528 B1 | 3/2011 | Dave et al. | |
| 8,402,032 B1* | 3/2013 | Brunsman | G06F 16/951 707/711 |
| 8,478,773 B1* | 7/2013 | Bryukhov | G06F 16/9535 707/723 |
| 2008/0133479 A1 | 6/2008 | Zelevinsky et al. | |
| 2012/0158621 A1* | 6/2012 | Bennett | G06F 16/334 706/12 |
| 2014/0201202 A1* | 7/2014 | Jones | G06F 16/332 707/723 |
| 2015/0006505 A1* | 1/2015 | Plakhov | G06F 16/3328 707/710 |

(Continued)

*Primary Examiner* — Cam Y T Truong
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and execute functions comprising: storing historical session data pertaining to user sessions and archived search queries submitted by users to a search engine; analyzing the historical session data to identify ambiguous queries, including semantically ambiguous queries and multi-language queries; monitoring search queries submitted to the search engine to detect the ambiguous queries; and in response to detecting an ambiguous query, generating a query resolution interface that displays categorical groupings, each of which corresponds to a possible intention of the ambiguous query. Other embodiments are disclosed herein.

20 Claims, 8 Drawing Sheets

(56) References Cited

U.S. PATENT DOCUMENTS

| | | | | |
|---|---|---|---|---|
| 2015/0052171 A1* | 2/2015 | Cheung | ............... | G06F 16/29 |
| | | | | 707/771 |
| 2015/0178392 A1* | 6/2015 | Jockisch | ............ | G06F 16/9535 |
| | | | | 707/706 |
| 2015/0347519 A1* | 12/2015 | Hornkvist | .......... | G06F 16/2457 |
| | | | | 707/722 |
| 2016/0005196 A1* | 1/2016 | Awadallah | ........... | G06T 11/206 |
| | | | | 345/440 |
| 2016/0203411 A1 | 7/2016 | Sadikov et al. | | |
| 2018/0052885 A1 | 2/2018 | Gaskill et al. | | |
| 2018/0067968 A1* | 3/2018 | Cheung | ............... | H04M 15/47 |
| 2018/0285444 A1* | 10/2018 | Joshi | ................. | G06F 16/435 |
| 2022/0269853 A1* | 8/2022 | Itani | .................... | G06F 40/103 |

* cited by examiner

300

- 401 – Storage Module(s)
  - 330 – Electronic Platform
    - 410 – Database(s)
      - 315 – Category Sectors
      - 310 – Items
      - 490 – Historical Session Data
        - 491 – Archived Search Queries
        - 492 – Historical Search Results
        - 493 – Engagement Information
        - 494 – User Sessions
    - 320 – Search Engine
      - 325 – Search Queries
        - 370 – Ambiguous Queries
          - 371 – Semantically Ambiguous Queries
          - 372 – Multi-Language Queries
      - 350 – Ambiguity Resolution Component
        - 355 – Query Resolution Interface
          - 450 – Categorical Groupings
      - 380 – Search Results
      - 420 – Query Classifier
- 402 – Processing Module(s)

810 – Storing historical session data pertaining to user sessions and archived search queries submitted by users to a search engine 820 – Analyzing the historical session data to identify ambiguous queries including semantically ambiguous queries and multi-language queries 830 – Storing the ambiguous queries in one or more databases 840 – Monitoring search queries submitted to the search engine to detect the ambiguous queries 850 – Generating a query resolution interface that displays categorical groupings in response to detecting an ambiguous query

SYSTEMS AND METHODS FOR DETECTING AND RESOLVING AMBIGUOUS SEARCH QUERIES

TECHNICAL FIELD

This disclosure relates generally to techniques for detecting and resolving ambiguous search queries.

BACKGROUND

Many electronic platforms provide search engines that enable users to search for items included in an online catalog. For example, users can submit search queries to the search engines, and the search engines can present search results to the users based on the search queries. However, in some scenarios, the search results presented to the users comprise items that are entirely unrelated to what those users desired. In many cases, undesired search results may be presented if the search queries submitted by users are ambiguous (e.g., if the search queries can apply to drastically different categories of items). It is common for traditional search engines to misinterpret the intention of such ambiguous queries and, in turn, present undesired items in the search results.

BRIEF DESCRIPTION OF THE DRAWINGS

To facilitate further description of the embodiments, the following drawings are provided in which:

FIG. 4 illustrates a representative block diagram of a portion of the system of FIG. 3 according to certain embodiments;

FIG. 8 illustrates a flowchart for a method according to certain embodiments.

Figure 1:
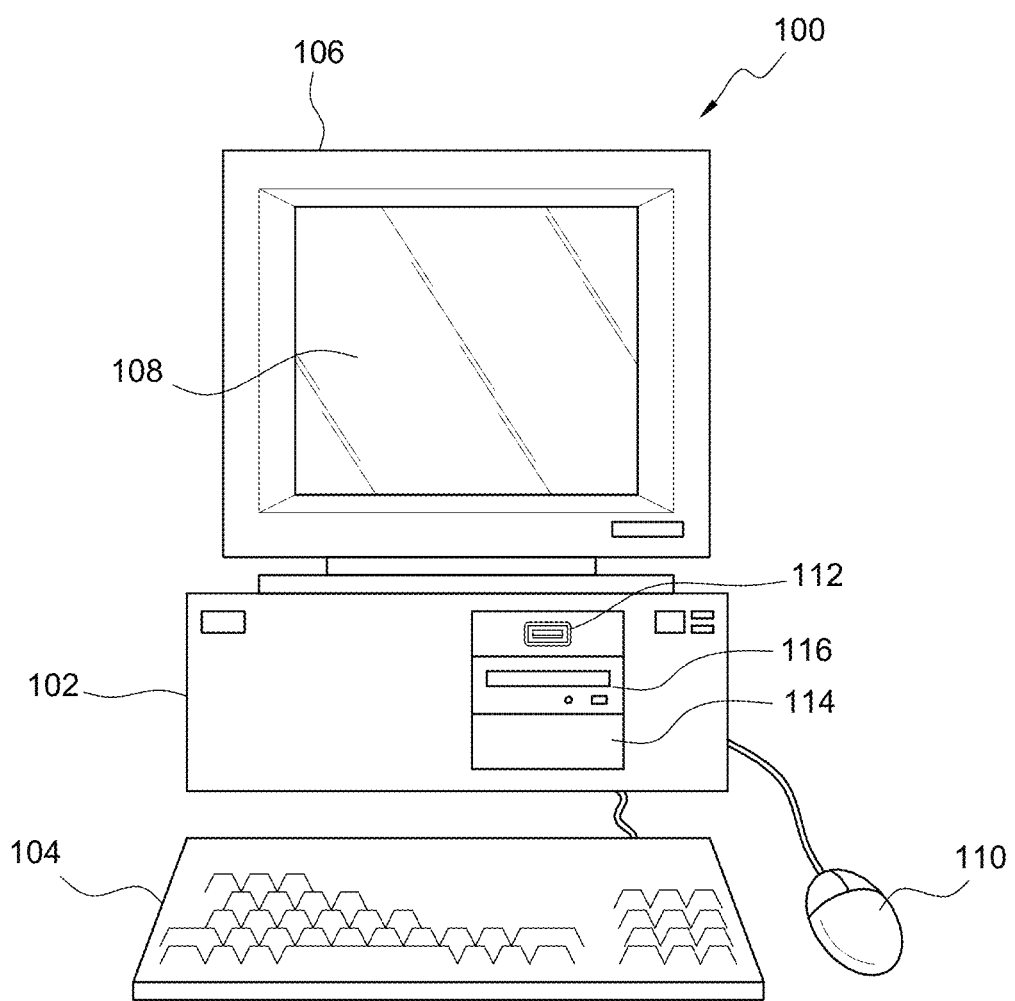
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and execute functions comprising: storing historical session data pertaining to user sessions and archived search queries submitted by users to a search engine; analyzing the historical session data to identify ambiguous queries, wherein analyzing the historical session data comprises: (a) analyzing the historical session data to detect semantically ambiguous queries, the semantically ambiguous queries being identified by detecting rapid correction instances in the user sessions; and (b) analyzing the historical session data to detect multi-language queries, the multi-language queries being identified by detecting archived search queries that correspond to unrelated category sectors when translated from a first language to a second language; monitoring search queries submitted to the search engine to detect the ambiguous queries; and in response to detecting an ambiguous query, generating a query resolution interface that displays categorical groupings, each of which corresponds to a possible intention of the ambiguous query.

Various embodiments include a method. The method can be implemented via execution of computing instructions configured to run at one or more processors and configured to be stored at non-transitory computer-readable media The method can comprise: storing historical session data pertaining to user sessions and archived search queries submitted by users to a search engine; analyzing the historical session data to identify ambiguous queries, wherein analyzing the historical session data comprises: (a) analyzing the historical session data to detect semantically ambiguous queries, the semantically ambiguous queries being identified by detecting rapid correction instances in the user sessions; and (b) analyzing the historical session data to detect multi-language queries, the multi-language queries being identified by detecting archived search queries that correspond to unrelated category sectors when translated from a first language to a second language; monitoring search queries submitted to the search engine to detect the ambiguous queries; and in response to detecting an ambiguous query, generating a query resolution interface that displays categorical groupings, each of which corresponds to a possible intention of the ambiguous query.

Figure 2:
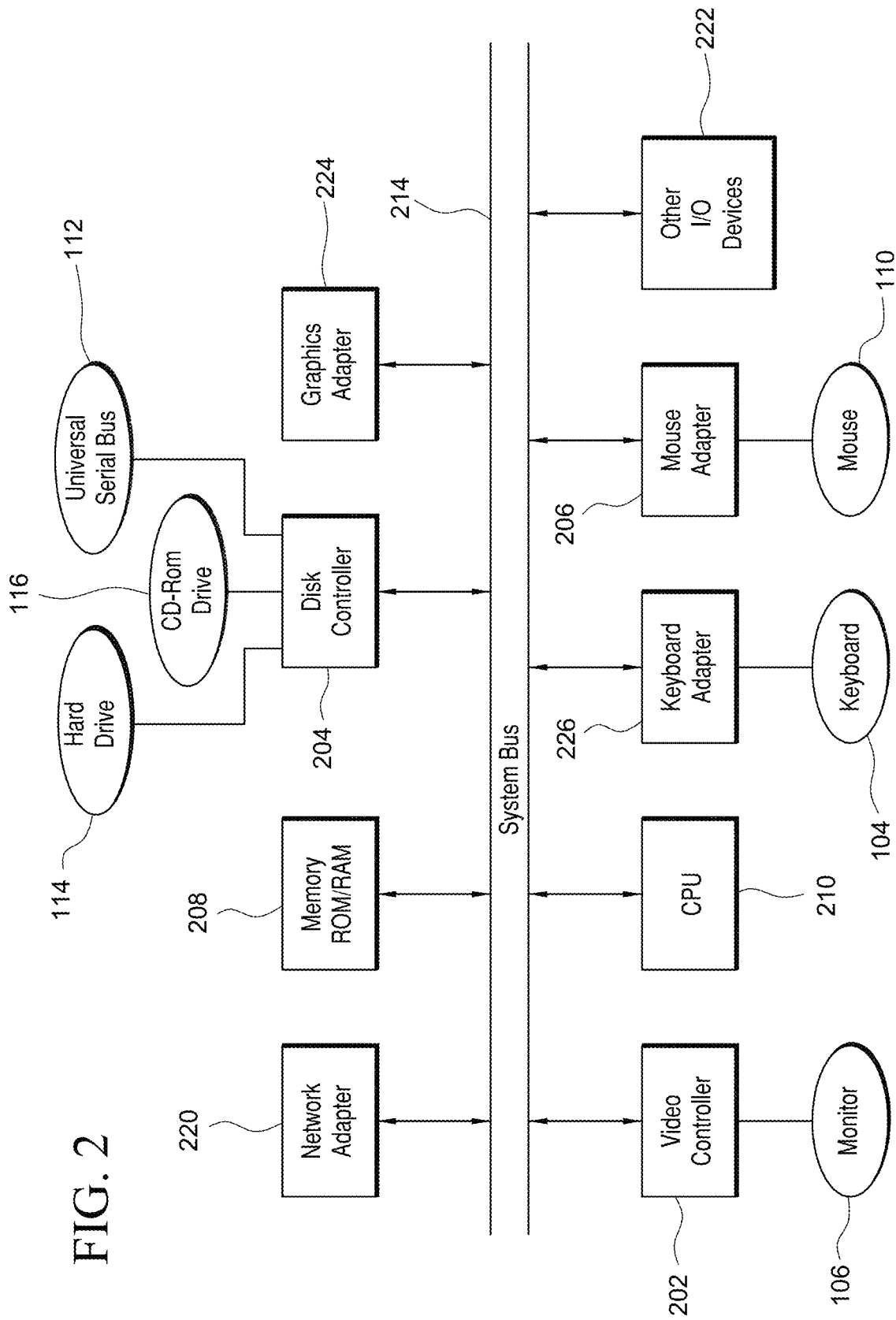
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
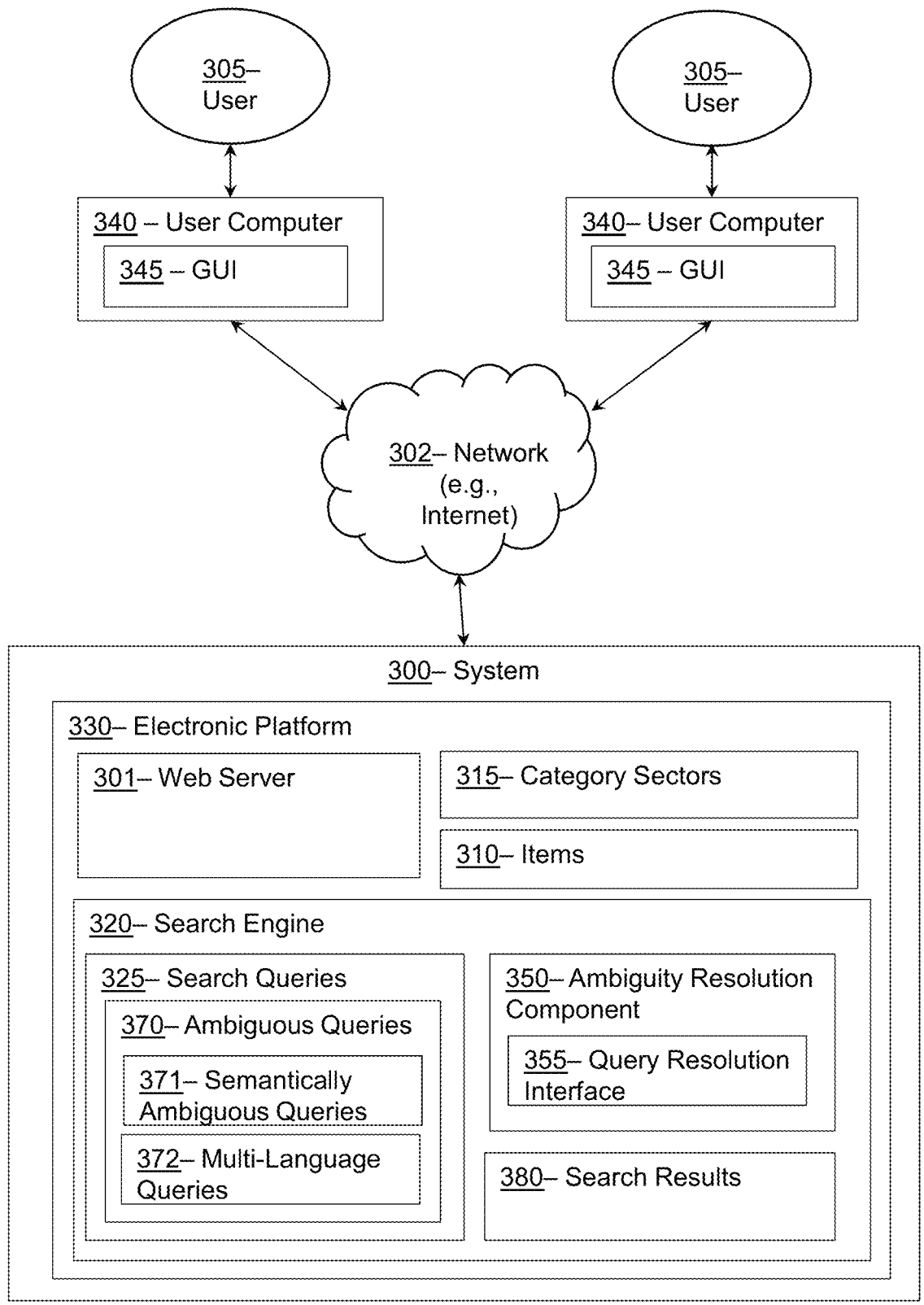
FIG. 3 illustrates a representative block diagram of a system, according to an embodiment.

Turning ahead in the drawings, FIG. 3 illustrates a block diagram of a system 300 that can be configured to resolve ambiguous queries, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 301, a search engine 320, an electronic platform 330, and an ambiguity resolution component 350. Web server 301, search engine 320, electronic platform 330, and/or ambiguity resolution component 350 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 301, search engine 320, electronic platform 330, and/or ambiguity resolution component 350. Additional details regarding web server 301, search engine 320, electronic platform 330, and/or ambiguity resolution component 350 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or server computer 310. In the same or different embodiments, GUI 345 can comprise a website accessed through network 302 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 301 can be in data communication through network 302 (e.g., the Internet) with user computers (e.g., 340). In certain embodiments, the network 302 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 301 can host one or more websites. For example, web server 301 can host an eCommerce website that allows users to browse and/or search for products, to add products to an electronic shopping cart, and/or to purchase products, in addition to other suitable activities.

In many embodiments, web server 301, search engine 320, electronic platform 330, and/or ambiguity resolution component 350 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 301, search engine 320, electronic platform 330, and/or ambiguity resolution component 350 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 301, search engine 320, electronic platform 330, and/or ambiguity resolution component 350. In a similar manner, the processing module(s) and the memory storage module(s) can be local and/or remote to each other.

In many embodiments, web server 301, search engine 320, electronic platform 330, and/or ambiguity resolution component 350 can be configured to communicate with one or more user computers 340. In some embodiments, user computers 340 also can be referred to as customer computers. In some embodiments, web server 301, search engine 320, electronic platform 330, and/or ambiguity resolution component 350 can communicate or interface (e.g., interact) with one or more customer computers (such as user computers 340) through a network 302 (e.g., the Internet). Network 302 can be an intranet that is not open to the public. Accordingly, in many embodiments, web server 301, search engine 320, electronic platform 330, and/or ambiguity resolution component 350 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 301, search engine 320, electronic platform 330, and/or ambiguity resolution component 350 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 301, search engine 320, electronic platform 330, and/or ambiguity resolution component 350, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, components, etc.).

In certain embodiments, users 305 may operate user computers 340 to browse, view, purchase, and/or order items 310 via the electronic platform 330. For example, the electronic platform 330 may include an eCommerce website that enables users 305 to add items 310 to a digital shopping cart and to purchase the added items 310. The items 310 made available via the electronic platform 330 may generally relate to any type of product and/or service including, but not limited to, products and/or services associated with groceries, household products, entertainment, furniture, apparel, kitchenware, electronics, fashion, appliances, sporting goods, etc.

Electronic platform 330 can include a search engine 320 that assists users 305 with identifying items 310. The search engine 320 may generally represent any application, program, and/or feature that is configured to search for items 310 included in database and/or online catalog. Users can be presented with GUIs 345 that enable the users to submit search queries 325 (e.g., strings and/or alphanumeric sequences of characters) to the search engine 320. Each of the search results 380 can correspond to an item 310 included in an online catalog associated with the electronic platform. Users 305 can utilize GUIs 345 to view the search results 380, select items 310 included in the search results 380 and, if desired, to add the items 310 to a digital shopping cart and/or initiate purchasing of the items 310.

Each search query 325 submitted to the search engine 320 can include one or more tokens. In many cases, the search queries 325 can represent strings (e.g., comprising text and/or numbers), and each token may generally represent a word or alphanumeric sequence included in the search query 325. In some cases, each token may represent a word or alphanumeric sequence that is separated or delimited by one or more spaces. For example, a search query 325 320 can include a string comprising "large black couch". In this example, the search query includes three separate tokens (token 1="large"; token 2="black"; and token 3="couch").

The electronic platform 330 also may store taxonomy information associated with the classifying the items 310 that are offered through the electronic platform 330. For example, the taxonomy information can include a hierarchy of categories and sub-categories, and each item 310 included in an online catalog can be associated with one or more of the categories and sub-categories. The structure and organization of the categories can vary across different electronic platforms 330.

While the taxonomy information may vary across different electronic platforms 330, the taxonomy information can include category sectors 315, which may generally represent high-level categories and/or departments that encompass broad ranges of items 310 related to particular labels. For example, in some scenarios, category sectors 315 can include broad labels such as "Beauty," "Clothing, Shoes, & Accessories," "Sports & Outdoors," "Grocery," "Electronics," etc. In some cases, the category sectors 315 can represent the highest level of classification in the taxonomy information.

One or more lower-level categories may segment each of the category sectors 315 into more specific sub-categories. For example, a category sector 315 for "Electronics" can include sub-categories associated with labels such as "TVs," "cell phones," "tablets," etc. Similarly, a category sector 315 for "Grocery" can include sub-categories such as "Fresh Produce," "Frozen," "Bakery," "Candy, "Beverages," etc. Moreover, each of the aforementioned sub-categories can also include their own sub-categories. For example, the "Beverages" sub-category can be segmented into additional sub-categories associated with labels such as "Water," "Tea," "Coffee," "Soft Drinks," etc. Each item 310 offered by the electronic platform 330 can be assigned to, or associated with, at least one category sector 315 and one or more applicable sub-categories.

Upon receiving a search query 325, the search engine 320 can utilize the search query 325 to identify relevant search results 380. In some embodiments, the search query 325 may initially be analyzed and/or processed by a query classifier that attempts to predict a user's intent from the search query 325, and to identify or predict one or more category sectors 315 indicating the intent of the user's search query 325. Additionally, the search engine 320 can identify search results 380, at least in part, by matching the tokens or terms included in the search queries 325 to metadata associated with items 310 in an online catalog (e.g., the names, titles, and/or keywords associated with items). In some cases, this matching is performed on items 310 that are assigned to, or associated with, the one or more category sectors 315 identified by the query classifier.

In some cases, the search queries 325 submitted by users 305 can include ambiguous queries 370. An ambiguous query 370 may generally represent a search query 325 that can be interpreted as applying to two or more unrelated item types and/or two or more item types that are classified in different category sectors 315. Examples of ambiguous queries 370 include semantically ambiguous queries 371 and multi-language queries 372.

Semantically ambiguous queries 371 can generally represent search queries 325 that are ambiguous because the meaning of the search queries can correspond to two or more unrelated item types (e.g., which are classified in different category sectors 315) depending upon the interpretation of the queries. Semantically ambiguous queries 371 can appear in many different scenarios. Below are some common examples of semantically ambiguous queries 371.

Some examples of semantically ambiguous queries 371 arise when tradenames or brands include a term that also refers to an item 310 or type of item 310. For example, a search query that includes the token "Apple" could refer to the brand Apple® which sells computing devices (which may be classified in an "Electronics" category sector 315), and also could refer to a fruit item (which may be classified in the "Grocery" category sector 315).

In other examples, a single token or query can be used to refer to two or more unrelated item types. In certain cases, this type of ambiguity arises in scenarios where a token that describes a grocery or food item also describes to an item in a different category sector 315. For example, the token "cone" can refer to a traffic cone (which may be classified in an "Automotive" category sector 315), but also could refer to an ice cream cone (which may be classified in the "Grocery" category sector 315). Likewise, the token "bar" can apply to many different item types, including a candy bar (which may be classified in the "Grocery" category sector 315), a furniture piece for serving beverages (which may be classified in the "Furniture" category sector 315), and a bar of soap (which may be classified in the "Personal Care" category sector 315).

In further examples, the intent of search query 325 can be ambiguous because the query can be interpreted in variety of different ways. For example, a search query 325 for "dog toy" can be interpreted as both a toy for a dog (which may be classified in the "Pets" category sector 315) and a children's toy that is in the form of dog (which may be classified in the "Toy" category sector 315). Semantically ambiguous queries 371 can arise in many other scenarios as well.

Multi-language queries 372 can generally relate to search queries 325 that identify different types of items 310 depending on the language in which they are interpreted. For example, a search query 325 that is interpreted in one language (e.g., English) may apply to items 310 in a particular category sector 315, while the same search query 325 may apply to unrelated items 315 included in a different category sector 315 if interpreted in a second language (e.g., Spanish, French, or Chinese).

For example, consider a search query 325 that includes the token "pan." If this search query 325 is interpreted in English, it may refer to a cooking apparatus or item that is included in a "Cookware" category sector 315. However, if this search query 325 is interpreted in Spanish, it may refer to a bread item that is included in a "Grocery" category sector 315.

Ambiguous search queries 370 can result in presentation of suboptimal search results 380 if they are not identified and handled appropriately. For example, in some scenarios, a search engine may select one possible interpretation of an ambiguous search query 370, and only display search results pertaining to the selected interpretation. If the selected interpretation does not represent the true intention of the user's search query 325, this can result in the user being presented with non-relevant search results 380 that are drastically different and unrelated to the products and/or services that are desired by the user (e.g., a user may be presented with search results from a Grocery category sector 315 despite the user's intention to search for electronic items). In other scenarios, a search engine may present search results 380 that include a mix of unrelated items from different category sectors 315, many of which are not interest to the user 305. In this scenario, a user 305 may be required to scroll or navigate through voluminous search results 380 to identify desired items 310 and/or submit new search queries 325 to refine the search results 380. This can lead to user frustration and a decrease in user retention and conversion rates.

To address these and other concerns, the electronic platform 330 and/or search engine 320 can include an ambiguity resolution component 350 configured to execute various functions for handling ambiguous queries 370 and improving user experiences on the electronic platform 330. Amongst other things, the ambiguity resolution component 350 can identify ambiguous queries 370 (including both semantically ambiguous queries 371 and multi-language queries 372), and generate a query resolution interface 355 for resolving any uncertainties associated with the ambiguous queries 370.

The query resolution interfaces 355 generated by the ambiguity resolution component 350 can represent a GUI 345 that enables users 305 to provide selections clarifying intentions or meanings for ambiguous queries 370. For example, given an ambiguous query 370, the ambiguity resolution component 350 can identify potentially relevant items 310 or item types across different category sectors 315, and generate a query resolution interface 355 specifically tailored to resolve the true intention behind the ambiguous query 370.

As explained in further detail below, the query resolution interface 355 can display a separate categorical grouping for each potential meaning of an ambiguous query 370 and/or for each candidate item type associated with the ambiguous query 370. The possible meanings or intentions of an ambiguous query 370 are each represented by a corresponding categorical grouping that displays a listing of items 310 related to a particular category sector 315. Additionally, each of the categorical groupings presented on the query resolution interface 355 can include options that enable a user to select or specify the desired categorical grouping, thereby clarifying the true intention of the ambiguous query 325.

Configuring a search engine 320 to identify and resolve ambiguous queries 370 can provide various advantages. One advantage is that the ambiguity of associated with a search query 325 can be quickly and easily resolved. Another advantage is that users save time and effort with respect to identifying desired items 310 in the search results 380 because irrelevant or undesired items types are removed from the search results 380. User are not required to excessively scroll through the search results 380 or submit additional search queries to identify desired items 310. Other advantages include improved user experiences, greater customer retention, and higher conversion rates.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing a search engine 320, electronic platform 330, and ambiguity resolution component 350. The one or more processing modules 402 can be configured to execute any and all instructions associated with implementing the functions performed by these components. Exemplary configurations for each of these components are described in further detail below.

The exemplary electronic platform 330 of system 300 includes one or more databases 410. The one or more databases 410 store data and information related to items 310 (e.g., products and/or services) that are offered or made available via the electronic platform 330. For example, for each item 310, metadata associated with the item 310 can include any or all of the following: a name or title associated with the item, one or more item categories associated with the item 310 (including one or more category sectors 315), a price, one or more customer ratings for the item, an item description, images corresponding to the item, and various other data associated with the item 310. In many cases, the search engine 320 can identify search results 380, at least in part, by matching tokens in a search query 325 to the names, titles, item descriptions, and/or other metadata associated with items 310.

The one or more databases 410 also may store taxonomy information associated with the classifying the items 310 that are offered through the electronic platform 330. As mentioned above, the taxonomy information can include a hierarchy of categories and sub-categories, and each item 310 included in an online catalog can be associated with one or more the categories and sub-categories. The taxonomy information can include category sectors 315, which may generally represent high-level categories and/or departments that encompass broad ranges of items 310.

The electronic platform 330 can be configured to track and store historical session data 490, which records some or all activities involving users' 305 interactions with electronic platform 330 and/or search engine 320. This historical session data also may be stored in the one or more databases 410.

In certain embodiments, the electronic platform 330 is configured to track and/or monitor users sessions 494. A user session 494 generally represents a given user's interactions with the electronic platform 330 during a particular timeframe. For example, a user session 494 may indicate search queries submitted by a user, items 310 view by a user, items 310 added to a digital shopping cart, items 310 ordered or purchased by the user, and/or other types of activities conducted by a user within a timeframe.

In certain embodiments, the historical session data 490 can store information for each user session 494 that indicates some or all of the following: data identifying the user 305 associated with the user session 494; search queries 325 that were submitted the user 305 (which can be stored as archived search queries 491) during the user session 494; search results 380 (and corresponding items 310) that were generated and/or presented to the user (which can be stored as "historical search results 492"); engagement information 493 indicating the user's interactions with the search results 380 (e.g., data indicating whether or not each item 380 was selected, viewed, ordered, purchased, and/or added a digital shopping cart by the user 305); category sectors 315 (described below) associated with the search results 380 and/or items 310; and/or any other data related to the user's 305 interactions with the electronic platform 330 and/or search engine 320.

In certain embodiments, the search engine 320 can include a query classifier 420 that is configured to predict the intents or meanings associated with search queries 325 submitted to the search engine 320. For a given search query 325, the query classifier 420 can identify one or more candidate category sectors 315 that are applicable to the intention of the search query 325. Token matching may then be performed on items 315 included in the one or more candidate category sectors 315 to identify search results 380 to be presented to users.

The configuration of the query classifier 420 can vary. In certain embodiments, the query classifier 420 can be implemented as one or more machine learning models, deep learning models, and/or artificial neural network models that are configured to execute deep learning functions, artificial intelligence (AI) functions, machine learning functions and/or other functions to predict intending meanings of search queries 325 (including ambiguous queries 370).

In certain embodiments, the query classifier 420 can include one or more sequencing models, such as BILS™ (bi-directional long-short term memory) models, each of which are trained to classify a given search query 325 into one more categorical sectors 315 that are associated with a predicted intent of the search query 325. In this example, the one or more BILS™ models can be connected to softmax and/or sigmoid classification layers to output classification predictions or label predictions for the one more categorical sectors 315. Moreover, the BILS™ models can be trained using engagement data 493 and/or other data included in the historical session data 490. A normalized squared loss function and/or other objective function can be employed to optimize learning during training.

As explained above, the electronic platform 330 and/or search engine 320 can include an ambiguity resolution component 350 configured to execute various functions for handling ambiguous queries 370 including, but not limited to, semantically ambiguous queries 371 and multi-language queries 382. The ambiguity resolution component 350 may initially perform an analysis to identify semantically ambiguous queries 371 and multi-language queries 382, and store those these queries in one or more logs and/or one or more databases. During runtime, search queries 325 submitted to the search engine 320 can be compared to the stored information to determine whether the search query 325 is ambiguous.

Figure 5:
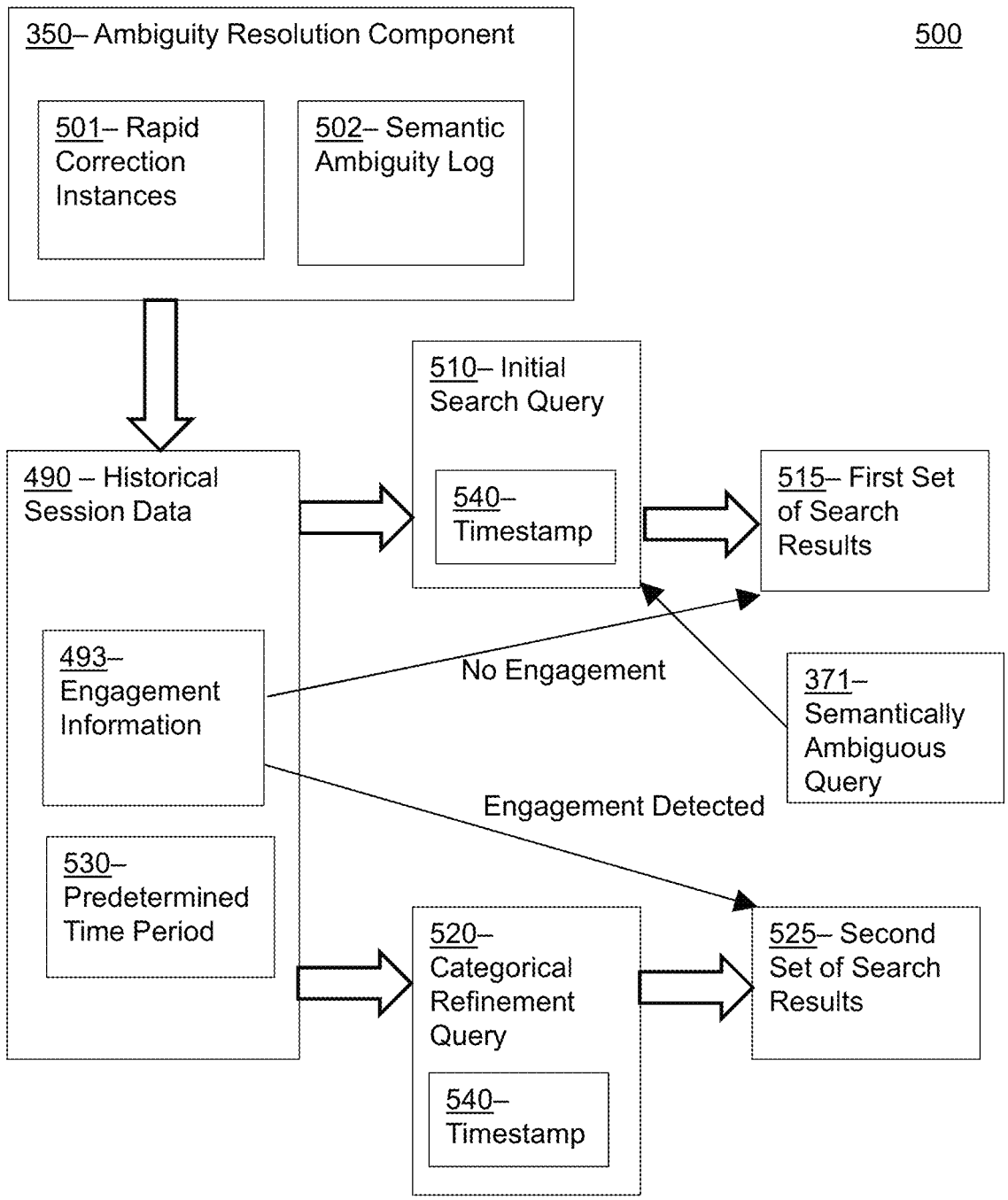
FIG. 5 illustrates a representative block diagram demonstrating an exemplary process flow for identifying semantically ambiguous queries according to certain embodiments.
Figure 6:
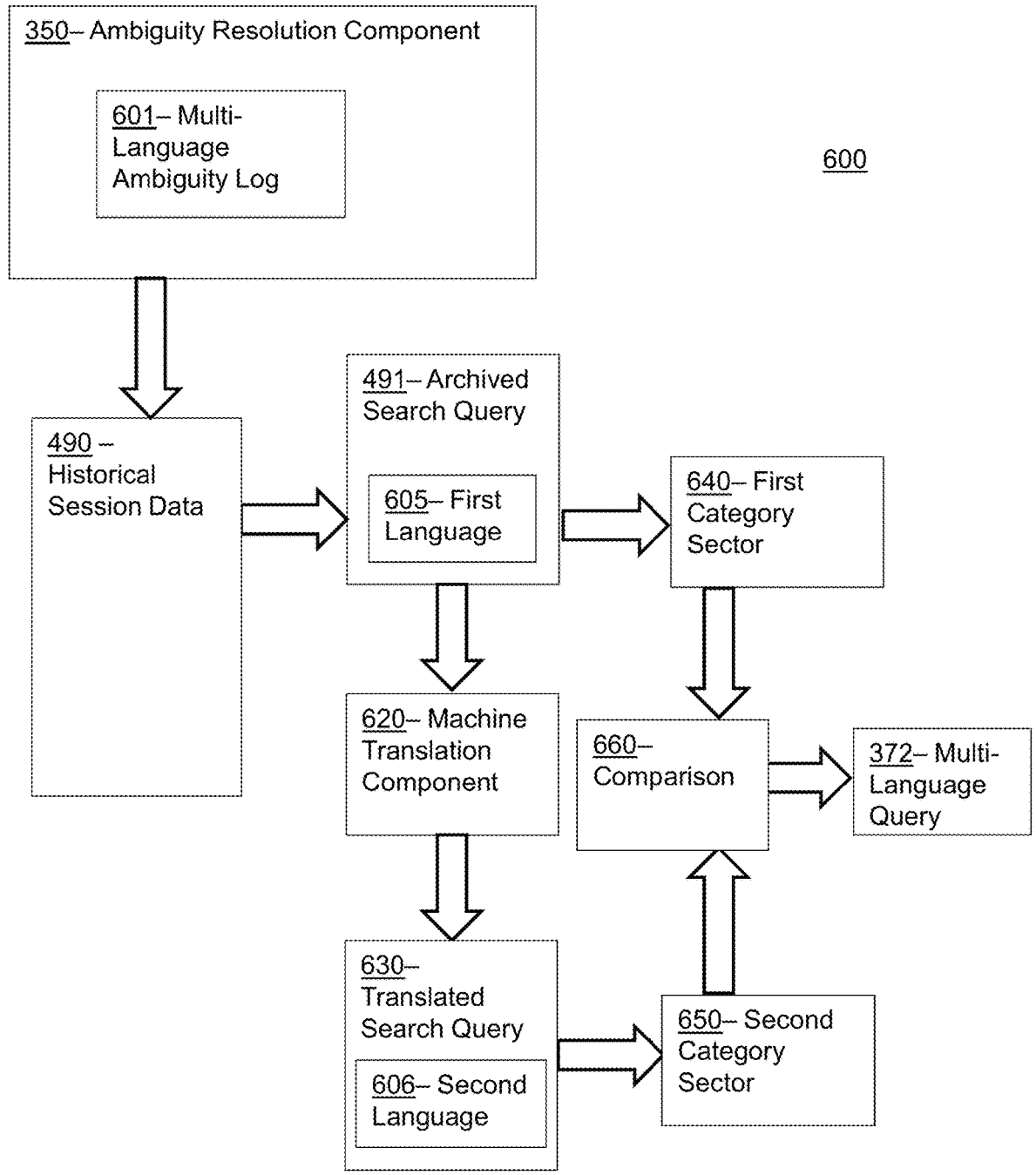
FIG. 6 illustrates a representative block diagram demonstrating a technique for identifying multi-language queries according to certain embodiments.

The manner in which the ambiguity resolution component 350 identifies semantically ambiguous queries 371 and multi-language queries 382 can vary. In certain embodiments, the ambiguity resolution component 350 analyzes the historical session data 490 to identify semantically ambiguous queries 371 and multi-language queries 382. FIGS. 5 and 6 illustrate exemplary techniques that can be used to identify semantically ambiguous queries 371 and multi-language queries 382, respectively.

FIG. 5 illustrates a representative block diagram demonstrating an exemplary process flow 500 for identifying semantically ambiguous queries 371 according to certain embodiments. The exemplary process flow 500 can be executed by the ambiguity resolution component 350.

The ambiguity resolution component 350 accesses and analyzes historical session data 490 to detect patterns in user sessions that identify semantically ambiguous queries 371. The semantically ambiguous queries 371 identified using the historical session data 490 can be stored in a semantic ambiguity log 502. The semantic ambiguity log 502 can include a listing, table, database, or the like, which records semantically ambiguous queries 371 along with additional information that identifies category sectors and/or item types associated with each of the semantically ambiguous queries 371.

To detect semantically ambiguous queries 371, the ambiguity resolution component 350 can analyze the historical session data 490 to detect rapid correction instances 501. A rapid correction instance 501 relates to a pattern of user interactions during a given user session which are indicative of a semantically ambiguous query 371. Thus, the ambiguity resolution component 350 can search the historical session data 490 to identify search queries that match the pattern of a rapid correction instance 501. The particular pattern utilized to identify a rapid correction instance 501 can vary.

In certain embodiments, a rapid correction instance 501 may generally be detected in scenarios where an initial archived search query 510 submitted by a user during a user session was followed by a second search query (a categorical refinement query 520) within a predetermined time period 530, and the second query generated search results 525 from a category sector that was different from the initial archived search query 510. This pattern may indicate that a user submitted the categorical refinement query 520 shortly after the initial archived search query 510 because the first set of search results 515 presented to the user in response to the initial archived search query 510 were not relevant. The categorical refinement query 520 resulted in presentation of a second set of search results 525 comprising items 310 from a category sector that was different from the category sector associated with the items that were presented to the user in response to the initial archived search query 510.

The predetermined time period 530 between the submission of the initial archived search query 510 and the categorical refinement query 520 can be set to any appropriate time period. In certain embodiments, the predetermined time period 530 can be set to one of the following: one minute; two minutes; five minutes; ten minutes; or thirty minutes. The actual time occurring between the submission of the initial archived search query 510 and the categorical refinement query 520 can be determined by comparing time stamps 540 indicating when each of the queries was submitted.

In certain embodiments, detecting a rapid correction instance 501 also can include analyzing engagement information 493 pertaining to the user's interaction with the first set of search results 515 and the second set of search results 525. For example, in some cases, identifying a rapid correction instance 501 may additionally include detecting that the first set of search results 515 presented to the user in response to the initial archived search query 510 were not engaged (e.g., selected, viewed, ordered, or added to a digital shopping cart) by the user, and detecting that the second set of historical search results 525 presented to the user in response to the categorical refinement query 520 were engaged by the user. This engagement pattern can confirm or indicate that the user did not find the first set of search results 515 to be relevant, but did find the second set of search results 525 to be relevant.

In certain embodiments, detecting a rapid correction instance 501 can further include an analysis of the tokens that were included in the initial archived search query 510 and categorical refinement query 520. For example, in some cases, identifying a rapid correction instance 501 may additionally include detecting that the categorical refinement query 520 includes all of the tokens that were included in the initial archived search query 510, plus additional tokens that were not included in the initial archived search query 510. This engagement pattern can confirm or indicate that the categorical refinement query 520 was submitted in an attempt to clarify the initial archived search query 510.

In certain embodiments, a rapid correction instance 501 can identified by detecting pattern of user interactions in a user session involving one or more of the following operations:
1) during a given user session for a user, detecting submission of a categorical refinement query 520 to a search engine within a pre-determined time period after the submission of an initial archived search query 510;
2) detecting that that the user did not engage (or had minimal engagement) with a first set of search results 515 presented to the user in response to the initial archived search query 510;
3) detecting that that the user did engage a second set of search results 525 presented to the user in response to the categorical refinement query 520; and/or
4) determining that the categorical refinement query 520 included all of the same tokens that were included in the initial archived search query 510 plus one or more additional tokens.

After a rapid correction instance 501 is detected in the historical session data 490, the initial archived search query 510 associated with the rapid correction instance 501 can be identified as a semantically ambiguous query 371 and stored in the semantic ambiguity log 502. Each semantically ambiguous query 371 can be stored with data identifying two or more category sectors that are applicable to the semantically ambiguous query 371.

To illustrate by way of example, suppose an entry was appended to the semantic ambiguity log 502 that identified "drumstick" as a semantically ambiguous query 371. In this example, the entry could be appended with data identifying two or more category sectors applicable to the query. For example, the entry may identify a category sector for "Musical Instruments" (which can include drumstick items associated with the playing the drums) and a category sector for "Food" (which can identify meat products referred to as drumsticks). Additional category sectors can be appended to the entry if there are brands or tradenames exist that include the term "drumstick" and/or if there are items 310 in other category sectors that are relevant to the term.

FIG. 6 illustrates a representative block diagram demonstrating an exemplary process flow 600 for identifying multi-language queries 372 according to certain embodiments. The exemplary process flow 600 can be executed by the ambiguity resolution component 350.

The ambiguity resolution component 350 generally can identify multi-language queries 372, at least in part, by analyzing archived search queries 491 included in the historical session data 490, and determining if the archived search queries 491 correspond to different category sectors when translated from a first language to a second language.

For example, for a given archived search query 491 received in a first language 605, the ambiguity resolution component 350 may identify a first category sector 640 that is associated with the archived search query 491 in the first language 605. The first category sector 640 may be identified based on the classifications of search results that are identified in response to the archived search query 491 in the first language 605. A machine translation component 620 may translate the archived search query 491 into a translated search query 630 in a second language 606. The ambiguity resolution component 350 may identify a second category sector 650 that is associated with the translated search query 630 in the second language 606. Again, the second category sector 650 may identified based on classifications of search results that are identified in response to translated search query 630.

The ambiguity resolution component 350 may perform a comparison 660 of the first category sector 640 and the second category sector 650. A multi-language query 372 may be identified in response to determining that the first category sector 640 and the second category sector 650 differ from one another. This lack of matching between the first category sector 640 and the second category sector 650 can indicate that the original archived search query 491 identifies items from one category sector, while the translated search query 630 identifies unrelated items classified in a different category sector.

Any multi-language queries 372 that are identified can be stored in a multi-language ambiguity log 601. The multi-language ambiguity log 601 can include a listing, table, database, or the like, which records the multi-language queries 372 along with additional information that identifies category sectors and/or item types associated with each of the multi-language queries 372.

To illustrate by way of example, the ambiguity resolution component 350 may analyze the archived search queries 491 to identify queries that are submitted in a first language 605 (e.g., Spanish). Consider an archived search query 491 that comprises the token "pie," which means "foot" in Spanish. A first category sector 640 (e.g., Apparel & Footwear) may be determined for the archived search query 491 in the first language 605. A machine translation component 620 can translate the archived search query 491 to a translated search query 630 in a second language 606 (e.g., English), and the second category sector 650 (e.g., Food) may be determined for the translated search query 630. Thereafter, a comparison 660 of the first category sector 640 (e.g., Footwear) and the second category sector 650 (e.g., Food) may be performed. If the first category sector 640 is not the same as the second category sector 650, the archived search query 491 (pie) may be saved in the multi-language ambiguity log 601 as a multi-language query 372, along with the information that identifies the first category sector 640 and second category sector 650.

Returning to FIG. 4, the ambiguity resolution component 350 can utilize the ambiguous queries 370 (e.g., the semantically ambiguous queries 371 and multi-language queries 372) identified using the aforementioned techniques to enhance processing of search queries 325 during run time. For example, search queries 325 received by the search engine 320 during run time can be compared to the ambiguous queries 370 saved in the semantic ambiguity log 502 (FIG. 5) and multi-language ambiguity log 503 (FIG. 6) in order to identify ambiguous queries 370.

Upon determining that an ambiguous query 370 has been submitted to the search engine, the ambiguity resolution component 350 can generate a query resolution interface 355 as described above. The query resolution interface 355 can present categorical groupings 450 of items 450, each of which corresponds to a potential target item type or intended meaning of the ambiguous query 370. The categorical groupings 450 can correspond to the category sectors 315 that were stored with the ambiguous query 370 in the semantic ambiguity log 502 (FIG. 5) and multi-language ambiguity log 503 (FIG. 6).

Figure 7:
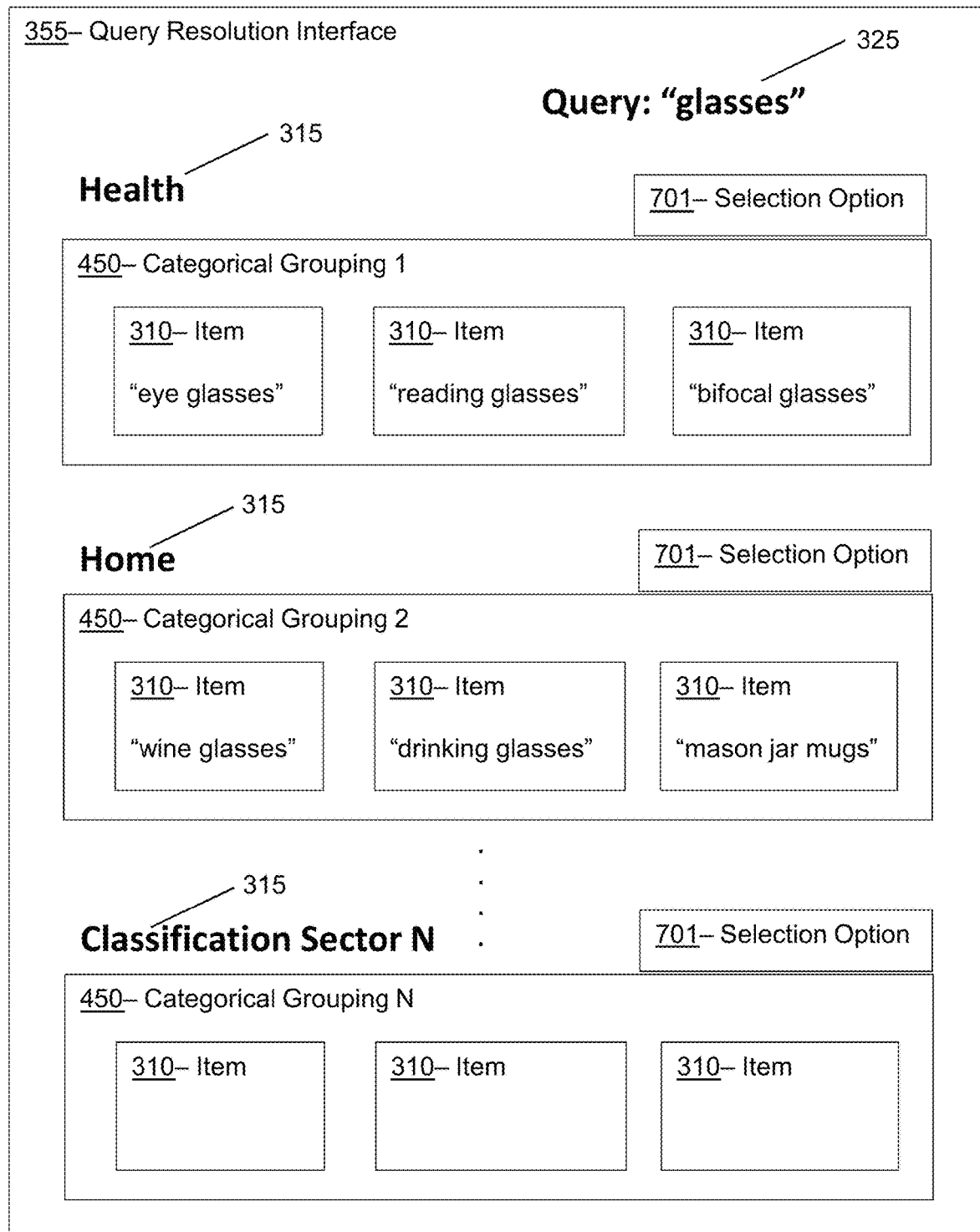
FIG. 7 illustrates a representative block diagram demonstrating an exemplary query resolution interface according to certain embodiments.

FIG. 7 is a block diagram illustrating an exemplary query resolution interface 355 according to certain embodiments. The query resolution interface 355 includes a plurality of categorical groupings 450. The query resolution interface 355 can generally include any number of categorical groupings 450. Each categorical grouping 450 can correspond to a potential meaning that was intended by an ambiguous query 370, and each categorical grouping 450 can include a grouping of items 310 that are associated with a category sector 315. Each categorical grouping 450 can be configured to be scrollable such that users can scroll through items 310 associated with the each category sector 315. Each categorical grouping 450 includes a selection option 701 that can be selected by users to clarify the intention of the ambiguous query 370 and/or to view search results included within a corresponding category sector 315.

In this example, the user has submitted a semantically ambiguous query 471 ("glasses") that can pertain to items included in more than one category sector (e.g., eyewear in a Health category sector and kitchenware in a Home category sector). Corresponding categorical groupings 450 are presented for each of the category sectors 315, along with selection options 701 that permit a user to specify the true intention of the semantically ambiguous query 471. In some cases, additional categorical groupings 450 also can be displayed (e.g., if "glasses" were a brand name and/or if the term resulted in multi-language ambiguities).

Categorical groupings 450 for multi-language queries 471 can be presented on a query resolution interface 355 in this same manner. For a given multi-language query 471, two or more category sectors 315 can be retrieved from a multi-language ambiguity log 601 (FIG. 6) and categorical groupings 450 corresponding to the category sectors 315 can be displayed on the query resolution interface 355. In this scenario, each categorical grouping 350 can represent a possible intended meaning of a multi-language query 471 in a particular language.

FIG. 8 illustrates a flow chart for an exemplary method 800, according to certain embodiments. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIGS. 3-4), electronic platform 330 (FIG. 3-4), search engine 320 (FIGS. 3-4), and/or ambiguity resolution component 350 (FIGS. 3-4) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as system 300 (FIGS. 3-4), electronic platform 330 (FIG. 3-4), and/or search engine 320 (FIGS. 3-4). The processing module(s) can be similar or identical to the processing module(s) described above with respect to computer system 100 (FIG. 1) and/or system 300 (FIGS. 3 and 4).

Method 800 can comprise an activity 810 of storing historical session data pertaining to user sessions and archived search queries submitted by users to a search engine.

Method 800 can further comprise an activity 820 of analyzing the historical session data to identify ambiguous queries including semantically ambiguous queries and multi-language queries. In some embodiments, analyzing the historical session data to detect semantically ambiguous queries can include detecting rapid correction instances in the user sessions. In some embodiments, analyzing the historical session data to detect multi-language queries can include detecting archived search queries that correspond to unrelated category sectors when translated from a first language to a second language.

Method 800 can further comprise an activity 830 of storing the ambiguous queries in one or more databases.

Method 800 can further comprise an activity 840 of monitoring search queries submitted to the search engine to detect the ambiguous queries.

Method 800 can further comprise an activity 850 of generating a query resolution interface that displays categorical groupings in response to detecting an ambiguous query. Each of the categorical groupings can correspond to a possible intention of the ambiguous query. Selection options can enable users to select the categorical groupings, and to view search results associated with selected category groupings.

As evidenced by the disclosure herein, the techniques set forth in this disclosure are rooted in computer technologies that overcome existing problems in known search engines, including problems associated with resolving ambiguous search queries. The techniques described in this disclosure provide a technical solution for overcoming the limitations associated with known techniques. Amongst other things, this technology solution can monitor or track user sessions in real-time, and detect usage patterns that are indicative of ambiguous search queries.

In certain embodiments, the techniques described herein can advantageously improve user experiences with electronic platforms by generating interfaces that enable users to clarify the meanings or intents associated with ambiguous queries. In various embodiments, the techniques described herein can be executed dynamically in real time by an electronic platform. In many embodiments, the techniques described herein can be used continuously at a scale that cannot be reasonably performed using manual techniques or the human mind (e.g., due to processing large quantities of historical session data). The data analyzed by the techniques described herein can be too large to be analyzed using manual techniques.

Although systems and methods for have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIG. 8 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform:
      storing historical session data pertaining to user sessions and archived search queries submitted by users to a search engine;
      analyzing the historical session data to identify ambiguous queries of the archived search queries, wherein the analyzing the historical session data comprises:
         analyzing the historical session data to detect semantically ambiguous queries and multi-language queries wherein:
            the multi-language queries being identified by detecting that a first category sector of an archived search query of the archived search queries in a first language is different from a second category sector of the archived search query in a second language, wherein the archived search query in a second language is a translation of the archived search query in the first language; and
            the semantically ambiguous queries are identified by detecting rapid correction instances in the user sessions, wherein detecting the rapid correction instances comprises detecting that a user did not engage a first set of historical search results associated with a first historical category sector;
      monitoring search queries submitted to the search engine to detect a detected ambiguous query of the search queries based on the ambiguous queries; and
      in response to detecting the detected ambiguous query, generating a query resolution interface that displays categorical groupings, wherein each categorical grouping of the categorical groupings corresponds to a possible intention of the detected ambiguous query.

2. The system of claim 1, wherein detecting the rapid correction instances further comprises:
   detecting an initial archived search query submitted by the user of the users during a user session of the user sessions; and
   detecting that the user submitted a categorical refinement query during the user session within a pre-determined time period after submitting the initial archived search query;
   wherein the first set of historical search results were presented to the user in response to the initial archived search query.

3. The system of claim 2, wherein detecting the rapid correction instances further comprises:
   detecting that the user did engage a second set of historical search results associated with a second historical category sector, wherein the second set of historical search results are presented to the user in response to the categorical refinement query and the second set of historical search results are associated with the second historical category sector that is different from the first historical category sector.

4. The system of claim 3, wherein detecting the rapid correction instances further comprises:
   detecting that the categorical refinement query includes all tokens that were included in the initial archived search query plus one or more additional tokens.

5. The system of claim 1, wherein one or more of:
   (a) each user session of the user sessions comprises one or more respective user interactions with the search engine by a given user of the users during a timeframe; or
   (b) detecting that the first category sector of the archived search query in the first language is different from the second category sector of the archived search query in the second language comprises:
      identifying an archived search query from the archived search queries submitted in the first language;
      determining the first category sector for the archived search query in the first language;
      translating, using a machine translation component, the archived search query to the second language;
      determining the second category sector for the archived search query in the second language; and
      determining that the first category sector is different from the second category sector.

6. The system of claim 1, wherein the categorical groupings displayed on the query resolution interface comprise:
   at least a first categorical grouping that presents a plurality of search results.

7. The system of claim 1, wherein:
   the semantically ambiguous queries are stored in one or more databases;
   each ambiguous query of the semantically ambiguous queries is stored with data identifying two or more of a plurality of category sectors;
   the detected ambiguous query is a semantically ambiguous query of the semantically ambiguous queries;
   in response to detecting the semantically ambiguous query being submitted to the search engine during run time, the two or more of the plurality of category sectors associated with the semantically ambiguous query are retrieved from the one or more databases; and
   the categorical groupings displayed on the query resolution interface correspond to the two or more of the plurality of category sectors associated with the semantically ambiguous query.

8. The system of claim 1, wherein:
   selection options are displayed with each categorical grouping of the categorical groupings on the query resolution interface; and the selection options enable users to specify an intention of the detected ambiguous query and to view search results from a corresponding categorical grouping.

9. The system of claim 1, wherein:
the semantically ambiguous queries are stored in one or more databases;
the multi-language queries are stored in the one or more databases; and
during run time, the search queries submitted to the search engine are compared to the semantically ambiguous queries and the multi-language queries stored in the one or more databases to identify the detected ambiguous query.

10. The system of claim 9, wherein:
two or more classification sectors are associated with each ambiguous query of the semantically ambiguous queries and the multi-language queries that are stored in the one or more databases; and
the two or more classification sectors are stored in the one or more databases.

11. A method implemented via execution of computing instructions configured to run at one or more processors and configured to be stored on non-transitory computer-readable media, the method comprising:
storing, by the one or more processors, historical session data pertaining to user sessions and archived search queries submitted by users to a search engine;
analyzing, by the one or more processors, the historical session data to identify ambiguous queries of the archived search queries, wherein the analyzing the historical session data comprises:
analyzing the historical session data to detect semantically ambiguous queries and multi-language queries wherein:
the multi-language queries being identified by detecting that a first category sector of an archived search query of the archived search queries in a first language is different from a second category sector of the archived search query in a second language, wherein the archived search query in a second language is a translation of the archived search query in the first language; and
the semantically ambiguous queries are identified by detecting rapid correction instances in the user sessions, wherein detecting the rapid correction instances comprises detecting that a user did not engage a first set of historical search results associated with a first historical category sector;
monitoring, by the one or more processors, search queries submitted to the search engine to detect a detected ambiguous query of the search queries based on the ambiguous queries; and
in response to detecting the detected ambiguous query, generating, by the one or more processors, a query resolution interface that displays categorical groupings, wherein each categorical grouping of the categorical groupings corresponds to a possible intention of the detected ambiguous query.

12. The method of claim 11, wherein detecting the rapid correction instances further comprises:
detecting an initial archived search query submitted by the user of the users during a user session of the user sessions; and
detecting that the user submitted a categorical refinement query during the user session within a pre-determined time period after submitting the initial archived search query;
wherein the first set of historical search results were presented to the user in response to the initial archived search query.

13. The method of claim 12, wherein detecting the rapid correction instances further comprises:
detecting that the user did engage a second set of historical search results associated with a second historical category sector, wherein the second set of historical search results are presented to the user in response to the categorical refinement query and the second set of historical search results are associated with the second historical category sector that is different from the first historical category sector.

14. The method of claim 13, wherein detecting the rapid correction instances further comprises:
detecting that the categorical refinement query includes all tokens that were included in the initial archived search query plus one or more additional tokens.

15. The method of claim 11, wherein one or more of:
(a) each user session of the user sessions comprises one or more respective user interactions with the search engine by a given user of the users during a timeframe; or
(b) detecting that the first category sector of the archived search query in the first language is different from the second category sector of the archived search query in the second language comprises:
identifying an archived search query from the archived search queries submitted in the first language;
determining the first category sector for the archived search query in the first language;
translating, using a machine translation component, the archived search query to the second language;
determining the second category sector for the archived search query in the second language; and
determining that the first category sector is different from the second category sector.

16. The method of claim 11, wherein the categorical groupings displayed on the query resolution interface comprise:
at least a first categorical grouping that presents a plurality of search results.

17. The method of claim 11, wherein:
the semantically ambiguous queries are stored in one or more databases;
each ambiguous query of the semantically ambiguous queries is stored with data identifying two or more of a plurality of category sectors;
the detected ambiguous query is a semantically ambiguous query of the semantically ambiguous queries;
in response to detecting the semantically ambiguous query being submitted to the search engine during run time, the two or more of the plurality of category sectors associated with the semantically ambiguous query are retrieved from the one or more databases; and
the categorical groupings displayed on the query resolution interface correspond to the two or more of the plurality of category sectors associated with the semantically ambiguous query.

18. The method of claim 11, wherein:
selection options are displayed with each categorical grouping of the categorical groupings on the query resolution interface; and
the selection options enable users to specify an intention of the detected ambiguous query and to view search results from a corresponding categorical grouping.

19. The method of claim 11, wherein:
the semantically ambiguous queries are stored in one or more databases;
the multi-language queries are stored in the one or more databases; and
during run time, the search queries submitted to the search engine are compared to the semantically ambiguous queries and the multi-language queries stored in the one or more databases to identify the detected ambiguous query.

20. The method of claim 19, wherein:
two or more classification sectors are associated with each ambiguous query of the semantically ambiguous queries and the multi-language queries that are stored in the one or more databases; and
the two or more classification sectors are stored in the one or more databases.

* * * * *